(12) United States Patent
Alexander

(10) Patent No.: US 12,314,998 B1
(45) Date of Patent: May 27, 2025

(54) METHOD AND SYSTEM FOR PROVIDING A CUSTOMIZABLE VIRTUAL REPRESENTATION TO A USER FOR ENABLING SELECTION OF CONSTRUCTION PRODUCTS AND INSTALLATION PRODUCTS

(71) Applicant: Robert Alexander, Folsom, CA (US)

(72) Inventor: Robert Alexander, Folsom, CA (US)

(73) Assignee: TilingMyWay, Folsom, CA (US)

( * ) Notice: Subject to any disclaimer, the term of this patent is extended or adjusted under 35 U.S.C. 154(b) by 310 days.

(21) Appl. No.: 18/079,744

(22) Filed: Dec. 12, 2022

(51) Int. Cl.
  *G06Q 30/00* (2023.01)
  *G06F 9/451* (2018.01)
  *G06Q 30/0601* (2023.01)
  *G06Q 50/08* (2012.01)
  *G06F 3/0482* (2013.01)

(52) U.S. Cl.
  CPC ......... *G06Q 30/0631* (2013.01); *G06F 9/451* (2018.02); *G06Q 30/0621* (2013.01); *G06Q 30/0643* (2013.01); *G06Q 50/08* (2013.01); *G06F 3/0482* (2013.01)

(58) Field of Classification Search
  CPC .. G06Q 50/04; G06Q 50/08; G06Q 30/06–08; G06F 3/0482
  USPC .............. 705/26.1, 26.5, 26.61, 26.7, 27.1–2
  See application file for complete search history.

(56) References Cited

U.S. PATENT DOCUMENTS

| | | | |
|---|---|---|---|
| 2008/0040303 A1* | 2/2008 | Fogelson | G06Q 30/02 706/26 |
| 2008/0162305 A1* | 7/2008 | Rousso | G06Q 30/08 705/26.5 |
| 2012/0221438 A1* | 8/2012 | Cook, Jr. | G06Q 30/0641 705/26.61 |
| 2018/0061053 A1* | 3/2018 | Lection | G06T 11/60 |
| 2018/0349862 A1* | 12/2018 | Ripley | G06Q 40/08 |
| 2021/0256580 A1* | 8/2021 | Norman | G06F 30/12 |
| 2023/0032961 A1* | 2/2023 | Hamilton | G06Q 30/0621 |

* cited by examiner

*Primary Examiner* — Ethan D Civan
(74) *Attorney, Agent, or Firm* — Christopher Pilling

(57) ABSTRACT

A processor-implemented method of providing a customizable virtual representation for selection and purchase of construction products and associated installation products, using a computing device is provided. The method includes generating and displaying a personalized set of selection options for the user based on a) a selection received from the user in a current interaction, b) a history of selections by the user in previous interactions, and c) a user preference data from online sources, on a graphical user interface (GUI) of the computing device, receiving a selection from the user in the personalized set of selection options via the GUI, and generating and displaying, a first multi-dimensional virtual representation of construction units with the selected personalized set of selection options, allowing user to modify the personalized set of selection options; and dynamically modifying the first multi-dimensional virtual representation and displaying a second multi-dimensional virtual representation based on modification of personalized set of selection options by user.

19 Claims, 11 Drawing Sheets

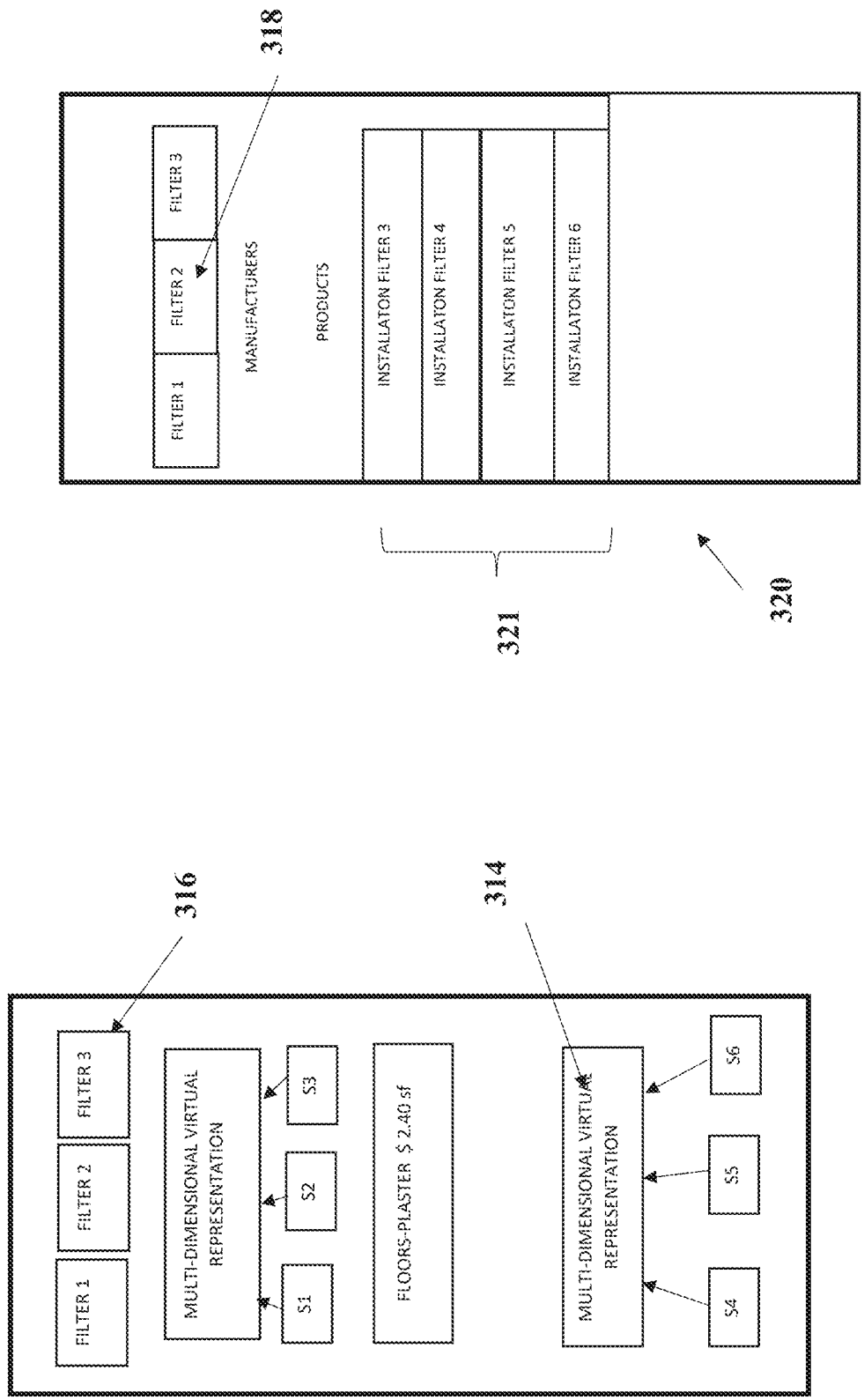

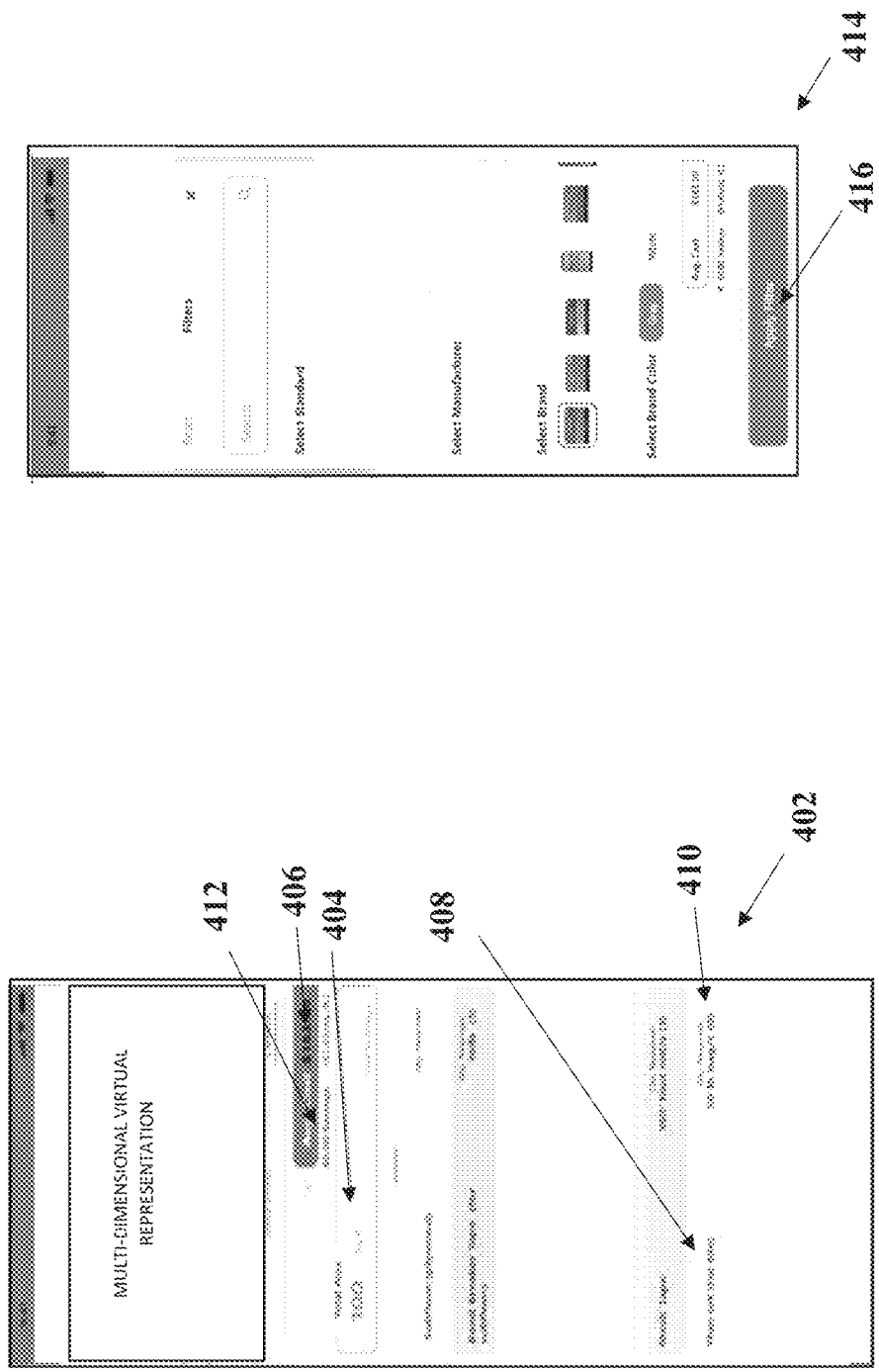

METHOD AND SYSTEM FOR PROVIDING A CUSTOMIZABLE VIRTUAL REPRESENTATION TO A USER FOR ENABLING SELECTION OF CONSTRUCTION PRODUCTS AND INSTALLATION PRODUCTS

BACKGROUND

Technical Field

The embodiments herein generally relate to construction product selection and purchase, and more particularly, to method and system for providing a customizable virtual representation to a user for enabling selection of construction products and installation products, using a computing device.

Description of the Related Art

Currently, construction projects require a lot of interaction with the vendors, designers, construction workers and customers. A construction company or manufacturer/vendor is usually unable to track the real-time inventory, availability, pricing, manufacturability, or raw material costs associated with customized construction products, such a flooring, modular kitchen units, and the like. Instead, these values are typically estimated and reconciled later. Thus, although building customization inherently includes a wide array of variables, the installers typically use average or estimated values and timetables with the hope that the values land close to reality after execution. Several currently known applications and systems provide cost estimates, virtual views, a plethora of selection options for construction products for enabling a user to make a selection. However, the currently known applications and systems fail to take into account the installation cost changes based on installation techniques that may be used to install the selected construction products.

Also, customers who are not working in the construction industry may still proceed without knowing which structure is the right design for them. Even in most cases, they start without knowing what kind of design or structure they want, which causes the repetition of design revisions to continue. In addition, the calculation of the estimated amount according to the architectural design drawing differs depending on the working time and expertise, and it is difficult to calculate the quantity and share real-time information with the cost according to the architectural design change, and it can be a design excluding the estimate.

Accordingly, there remains a need for a system and a method that provides a customizable virtual representation for a user for selection and purchase of one or more construction products and one or more associated installation products.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

The instant application solves all of the foregoing problems by providing a customizable virtual representation for selection and purchase of one or more construction products and one or more associated installation products, using a computing device that enables a user, such as an installer to get a virtual visualization of construction products and associated installation products along with their respective real-time comparative pricing estimate, and savings for each selection, that enables the user to make a better and easier selection and purchase.

A number of systems, processor-implemented methods, and non-transitory computer-readable mediums for providing a customizable virtual representation for selection and purchase of one or more construction products and one or more associated installation products, using a computing device is disclosed.

In one aspect, a processor-implemented method of providing a customizable virtual representation for selection and purchase of one or more construction products and one or more associated installation products, using a computing device is provided. The method includes generating and displaying, using a processor, a personalized set of selection options for the user based on at least one of: a) the selection received from the user in a current interaction, b) a history of selections by the user in one or more previous interactions, and c) a user preference data. The method further includes receiving a selection from the user in the personalized set of selection options and generating and displaying a first multi-dimensional virtual representation of one or more construction units with the selected personalized set of options comprising: a first set of one or more construction products and a first set of one or more associated installation products, with a corresponding material specification for each of the first set of one or more construction products and the first set of one or more associated installation products. The multi-dimensional virtual representation provides a customizable virtual representation to the user for enabling the user to make a purchase decision. The method further includes allowing the user to modify at least one of: a) the one or more construction products, and b) the one or more associated installation products, c) one or more construction metrics specification, and d) one or more manufacturer selections, and e) one or more vendor selections, in the personalized set of selection options and dynamically modifying the first multi-dimensional virtual representation into a second multi-dimensional virtual representation with changes in at least one of: a) the one or more construction products, and b) the one or more associated installation products, c) one or more construction metrics specification, and d) one or more manufacturer selections, based on the modification to the personalized set of selection options by the user and displaying the second multi-dimensional virtual representation. The user is allowed to make selection and purchase of the one or more construction products and one or more associated installation products via the GUI and where the first and the second multi-dimensional virtual representations provides a customizable virtual representation to the user for enabling the user to make a purchase decision.

In one embodiment, the personalized set of selection options includes one or more of: the one or more construction products, the one or more associated installation products, one or more manufacturer selections, and one or more construction metrics specification comprising at least one of: an estimate of quantity and a comparative pricing by one or more vendors, of one or more construction products and one or more associated installation products per unit of construction metric specification, and a cost saving per unit of construction metric specification. In an embodiment, the personalized set of selection options are generated in real-time using artificial intelligence.

In an embodiment, prior to generating and displaying a personalized set of selection options for the user, the method includes receiving a selection of at least one of: a) the one or more construction products, and b) the one or more associated installation products, c) one or more construction metrics specification, d) one or more manufacturer selections, and e) one or more vendor selections, from the user via the GUI, wherein the one or more associated installation products correspond to products that enable installation of the one or more construction products on construction units.

In an embodiment, generating and displaying the personalized set of selection options for the user includes analyzing at least one of: a) the selection received from the user in a current interaction, b) a history of selections by the user in one or more previous interactions, and c) a user preference data, generating the personalized set of selection options for the user, where the user preference data is gathered from one or more third party sources, dynamically retrieving pricing details associated with the generated personalized set of selection options for the user from a database, and displaying the generated personalized set of selection options along with the dynamically retrieved pricing details to the user via the GUI.

In an embodiment, allowing the user to modify the selection includes providing one or more filters for filtering the selected one or more construction products and the selected one or more associated installation products, receiving selection of one or more filters by the user via the GUI, and generating the modified multi-dimensional virtual representation with modification to at least one of: a) the one or more construction products, and b) the one or more associated installation products, c) one or more construction metrics specification, and d) one or more manufacturer selections, based on the one or more filters selected by the user, wherein the modified the modified multi-dimensional virtual representation comprises one or more recommendations with highlights for beneficial options for the user that enables the user to make the right choice. The beneficial options could be beneficial in terms of for example, yields, weights, price, cost saving, dry times, fastest installation, time saving, volume, specifications, and the like.

In an embodiment, comparative pricing includes at least one of: comparative percentage costs, comparative cost savings, comparative earnings based on estimates for installers, and comparative pricing from a plurality of vendors or manufacturers. In an embodiment, the modifications are predetermined/pre-set by the manufacturers and selected by the user to personalize the modifications while interacting with the GUI.

In an embodiment, the personalized set of selection options further includes a catalog of comparative pricing of the selected construction products and selected associated installation products. The catalog of comparative pricing comprises at least one of: a) a total cost of the selected construction products and selected associated installation products, b) comparative cost estimates for the each of the selected construction products and selected associated installation products, and c) comparative savings estimates for the each of the selected one or more construction products and the selected one or more associated installation products, and d) comparative costs of one or more construction products and/or one or more associated installation products as provided by a plurality of retailors.

In an embodiment, the first multi-dimensional virtual representation comprises a multi-dimensional perspective view of the selection received from the user from the personalized set of selection options. In an embodiment, the first multi-dimensional virtual representation and the second multi-dimensional virtual representation includes a multi-dimensional perspective view of the first set of one or more construction products and the first set of one or more associated installation products from the personalized set of selection options selected by the user, along with the corresponding material specification for each of the first set of one or more construction products and the first set of one or more associated installation products. The multi-dimensional perspective view includes a perspective view of the first set of one or more construction products installed using the first set of one or more associated installation products along with a perspective view of the first set of one or more associated installation products also depicted therein.

In an embodiment, displaying the personalized set of options includes displaying a track of at least one of: savings, earnings, growth, potential, performance of the user, materials, installation techniques, construction product specification, for each individual selection option from among the one or more construction products and the one or more associated installation products.

In an embodiment, the user is allowed to save one or more favorite selection options. In an embodiment, the plurality of options for selection of one or more construction products and one or more associated installation products comprises at least one of: selection based on a manufacturer of a construction material, selection based on a manufacturer specification/s, selection based on an industry standard, selection based on a construction material specification. Examples of the construction material specifications includes, but is not limited to a material yield, color and/or design of construction material, price of construction material, and the like.

In another aspect, a system for providing a personalized customizable virtual representation for selection and purchase of one or more construction products and one or more associated installation products is provided. The system includes a memory and a processor. The memory stores non-transitory executable instructions and a relational database comprising data associated with a plurality of construction products, a plurality of associated installation products, and one or more construction metrics specifications. The processor executes the non-transitory executable instructions using the relational database for performing the steps of: generating and displaying a personalized set of selection options for the user based on at least one of: a) the selection received from the user in a current interaction, b) a history of selections by the user in one or more previous interactions, and c) a user preference data from one or more online sources, receiving a selection from the user in the personalized set of selection options, and generating and displaying a first multi-dimensional representation of one or more construction units with a first set of one or more construction products and a first set of one or more associated installation products, with a corresponding material specification for each of the first set of one or more construction products and the first set of one or more associated installation products, based on the selection by the user. The processor also performs the steps of allowing the user to modify at least one of: a) the one or more construction products, and b) the one or more associated installation products, c) one or more construction metrics specification, d) one or more manufacturer selections, and e) one or more vendor selections, in the personalized set of selection options and dynamically modifying the first multi-dimensional virtual representation and displaying a second multi-dimensional virtual representation with changes in at least one of: a) the one or more construction products, and b) the one or more associated installation products, c) one or more construction metrics specification, d) one or more manufacturer selections, and e) one or more vendor selections, based on the modification of the personalized set of selection options by the user. The user is allowed to make selection and purchase of the one or more construction products and one or more associated installation products via the GUI and whereby the first and the second multi-dimensional virtual representations provides a customizable virtual representation to the user for enabling the user to make a purchase decision.

In an embodiment, the user is allowed to modify at least one of: a) the one or more construction products, and b) the one or more associated installation products, c) one or more construction metrics specification, d) one or more manufacturer selections, and e) one or more vendor selections, in the personalized set of selection options and the multi-dimensional virtual representation is dynamically modified, based on the modification by the user and a modified multi-dimensional virtual representation with changes in at least one of: a) the one or more construction products, and b) the one or more associated installation products, c) one or more construction metrics specification, d) one or more manufacturer selections, and e) one or more vendor selections, based on the modification, is displayed to the user.

In an embodiment, the pricing details associated with the selected one or more construction products and the one or more associated installation products are dynamically retrieved from the relational database, based on the selection received from the user and the personalized set of selection options is generated based on the dynamically retrieved pricing details.

In an embodiment, allowing the user to modify the selection includes providing one or more filters for filtering the selected one or more construction products and the selected one or more associated installation products, receiving selection of one or more filters by the user via the GUI, and generating the modified multi-dimensional virtual representation with modification to at least one of: a) the one or more construction products, and b) the one or more associated installation products, c) one or more construction metrics specification, d) one or more manufacturer selections, and e) one or more vendor selections, based on the one or more filters selected by the user, wherein the modified multi-dimensional virtual representation comprises one or more recommendations with highlights for beneficial options for the user that enables the user to make the right choice.

In yet another aspect, one or more non-transitory computer readable storage mediums storing one or more sequences of instructions, which when executed by one or more processors, causes a method providing a customizable virtual representation for selection and purchase of one or more construction products and one or more associated installation products, using a computing device is provided. The method includes generating and displaying, using a processor, a personalized set of selection options for the user based on at least one of: a) the selection received from the user in a current interaction, b) a history of selections by the user in one or more previous interactions, and c) a user preference data. The method further includes receiving a selection from the user in the personalized set of selection options and generating and displaying a first multi-dimensional virtual representation of one or more construction units with the selected personalized set of options comprising: a first set of one or more construction products and a first set of one or more associated installation products, with a corresponding material specification for each of the first set of one or more construction products and the first set of one or more associated installation products. The multi-dimensional virtual representation provides a customizable virtual representation to the user for enabling the user to make a purchase decision. The method further includes allowing the user to modify at least one of: a) the one or more construction products, and b) the one or more associated installation products, c) one or more construction metrics specification, and d) one or more manufacturer selections, and e) one or more vendor selections, in the personalized set of selection options and dynamically modifying the first multi-dimensional virtual representation and displaying a second multi-dimensional virtual representation with changes in at least one of: a) the one or more construction products, and b) the one or more associated installation products, c) one or more construction metrics specification, and d) one or more manufacturer selections, based on the modification to the personalized set of selection options by the user. The user is allowed to make selection and purchase of the one or more construction products and one or more associated installation products via the GUI and where the first and the second multi-dimensional virtual representations provides a customizable virtual representation to the user for enabling the user to make a purchase decision.

Various embodiments of the present technology enable integration of construction material data (manufacturer specifications and retailer pricing) into a database. Additionally, the present technology provides a customizable virtual representation to the user to enable selection and purchase of construction products and associated installation products. The present technology also provides a unique virtual multi-dimensional representation of the selected construction products overlayed with the associated installation products, that provides a customizable virtual representation of the user selections, personalized based on the user preference data. The present technology also enables the user to obtain a comparative pricing for various selections and also cost savings and enables the user to make better decision regarding selection and purchase of the construction products and associated installation products. Moreover, the present technology provides a personalized experience to the user by determining selection options for the user based on user preference data, and current or history of selections by the user and also allows the user to filter/modify selections. The present technology not only enables the user to visualize customizable virtual representation of construction products/and or installation products, but also lets the user choose and modify the installation products that can be used for installing the selected construction products, thereby providing realistic and more accurate cost estimates and cost saving estimates to the user.

BRIEF DESCRIPTION OF THE DRAWINGS

The embodiments herein will be better understood from the following detailed description with reference to the drawings, in which:

FIGS. 3C-3E exemplarily illustrates generation and modification of three-dimensional (3D) virtual representations by the system, in accordance with an exemplary scenario;

FIG. 4A illustrates selection of installation products based on the one or more filters selected by the user, in accordance with an exemplary scenario;

FIG. 4B illustrates selection of default options for various manufacturer specifications by the user, in accordance with an exemplary scenario;

DETAILED DESCRIPTION OF PREFERRED EMBODIMENTS

Figure 1:
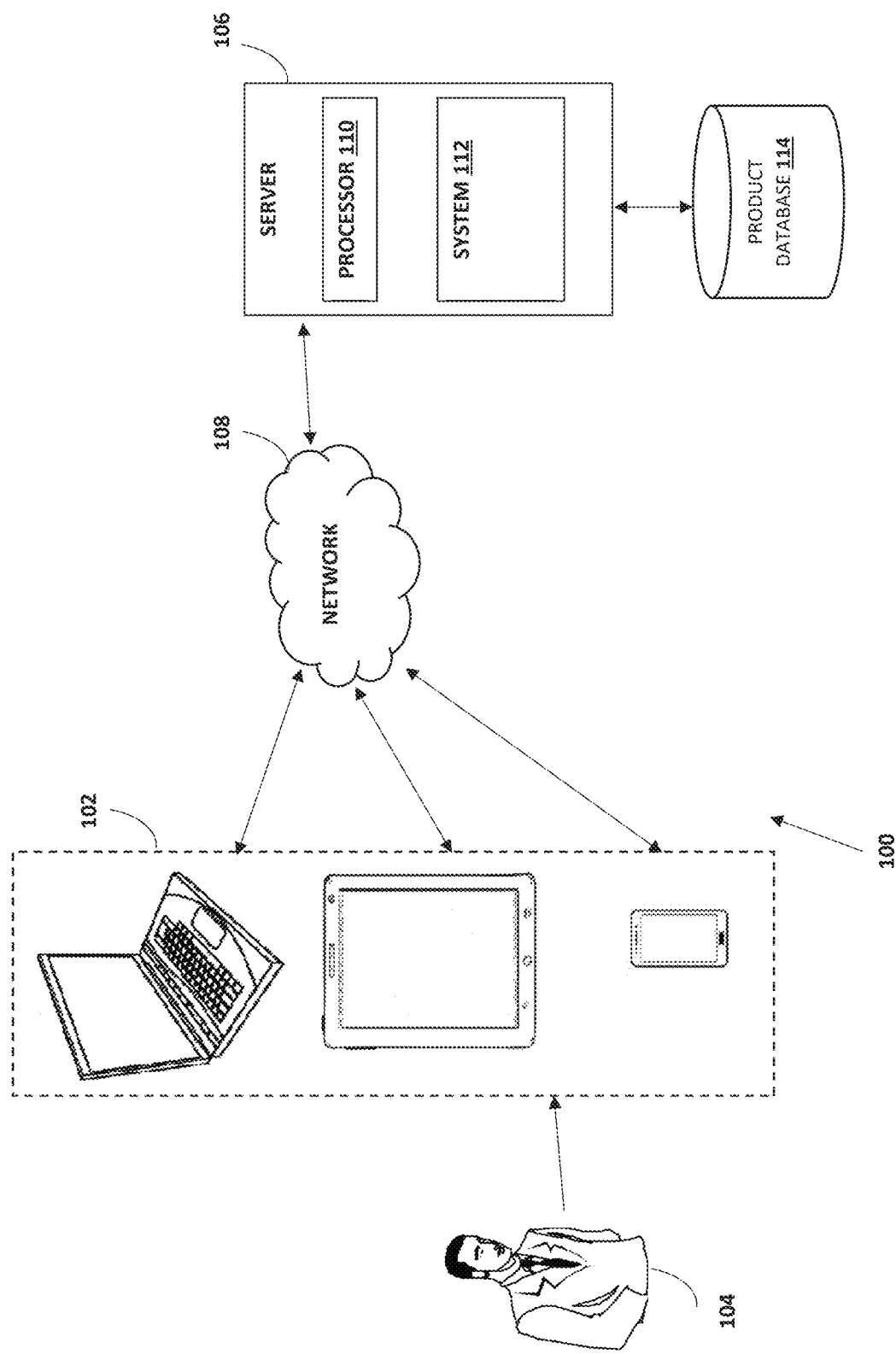
FIG. 1 depicts an environment view of the system for providing a customizable virtual representation for selection and purchase of one or more construction products and one or more associated installation products, using a computing device, in accordance with an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide methods and systems for providing a personalized visualization experience for selection and purchase of one or more construction products and one or more associated installation products, using a computing device. Examples of the construction products includes, but are not limited to, flooring, wall colors or features, cabinets, bathroom options, wood, steel, fasteners, roofing, outlet placement, kitchen options, plumbing, electrical, insulation, concrete, windows, doors, and the like. Examples of the installation products includes, but is not limited to wood substrate, subflooring, bond coat, mortar bed, metal lath, underlayment, and the like. The system of the present technology receives a selection of at least one of: a) the one or more construction products, b) the one or more associated installation products, c) one or more construction metrics specification, and d) one or more manufacture selection from a user via a graphical user interface (GUI) of the computing device. The GUI displays a plurality of options for selection of one or more construction products and one or more associated installation products. The system generates and displays a personalized set of selection options for the user based on at least one of: a) the selection received from the user in a current interaction, b) a history of selections by the user in one or more previous interactions, and c) a user preference data. The user preference data is gathered from one or more third party sources. The personalized set of selection options are generated in real-time using artificial intelligence. The personalized set of selection options includes one or more of: an estimate of quantity and a comparative pricing by one or more vendors, of one or more construction products and one or more associated installation products per unit of construction metric specification, a cost saving per unit of construction metric specification (for example, a total square feet), and the like. The estimate of quantity includes an estimate of a total weight/yield of the construction product and/or installation products selected by the user based on construction metric specifications, such as total square foot. Based on the selection received from the user in the personalized set of selection options, the system dynamically generates and displays a multi-dimensional virtual representation of one or more construction units with the selected construction products and the associated installation products, with a corresponding material specification for each of the first set of one or more construction products and the first set of one or more associated installation products, based on the selection by the user. The multi-dimensional virtual representation provides a customizable virtual representation to the user for enabling the user to make a purchase decision. The user is allowed to make selection and purchase of the one or more construction products and one or more associated installation products via the GUI.

FIG. 1 depicts an environment view 100 of the system for providing a customizable virtual representation for selection and purchase of one or more construction products and one or more associated installation products, using a computing device, in accordance with an embodiment. The environment view 100 includes a computing device 102 accessed by a user 104 and in communication with a server 106 via a network 108. Examples of the computing device 102 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. Examples of the network 108 include 3rd Generation Partnership Project (3GPP) network, and Long Term (LTE). Evolution) network, 5GPP (5th Generation Partnership Project) network, WIMAX (World Interoperability for Microwave Access) network, Internet, LAN (Local Area Network), Wireless LAN (Wireless Local Area Network), WAN (Wide Area Network), Personal Area Network (PAN), Bluetooth (Bluetooth) network, NFC network, satellite broadcasting network, analog broadcasting network, Digital Multimedia Broadcasting (DMB) network, and the like.

The user 104 may include, but is not limited to a construction material installer, a construction material purchaser, and the like. The server 106 includes a processor 110 and a system 112 for providing a personalized user experience for selection and purchase of one or more construction products and one or more associated installation products, using the computing device 102. The server 106 is communicatively coupled to a product database 114. In an embodiment, the product database 114 includes a list of construction products, and associated installation products, corresponding material specification for each of the construction products and associated installation products, such as an initial price, a unit price for each of construction products, and associated installation, a plurality of product assemblies with each product assembly corresponding to one of the plurality of customization options, pricing data (such as manufacturer cost, labor cost, overhead, adjustment factors, suggested retail price or mark-up factor) and the like. The product database 114 may include "a single database or multiple networked or otherwise linked databases.

For the purpose of illustration, the system 112 is shown as a part of the server 106, however in several embodiments, the system 112 is external to the server 106 but is communicatively coupled to the server 106 via the network 108. In some embodiments, the system 112 is installed as an application in the client device 102. In an embodiment, the user 104 logs into or signs into the application by providing logic credentials unique to the use to begin using the system 112. The system 112 is configured to receive a selection of at least one of: a) the one or more construction products, b) the one or more associated installation products, c) one or more construction metrics specification, and d) one or more manufacturer selections from the user 104 via a graphical user interface (GUI) of the computing device 102 that displays a plurality of options for selection of one or more construction products and one or more associated installation products. The associated installation products correspond to products that enable installation of the one or more construction products on construction units. The plurality of options for selection of one or more construction products and one or more associated installation products includes, but is not limited to a selection based on a manufacturer of a construction material, a selection based on a manufacturer specification/s, a selection based on an industry standard, a selection based on a construction material weight, a selection based on a construction material yield, a selection based on color of the construction material, a selection based on price of the construction material, and the like.

The system 112 generates and displays a personalized set of selection options for the user based on at least one of: a) the selection received from the user in a current interaction, b) a history of selections by the user in one or more previous interactions, and c) a user preference data. The user preference data is gathered from one or more third party sources. The third party sources include for example, social media accounts, online purchase activity of the user, and the like. In an embodiment, the personalized set of selection options are generated in real-time using artificial intelligence based techniques. In several other embodiments the personalized set of election options is generated in real-time using a software algorithm. The personalized set of selection options includes at least one of: the one or more construction products, the one or more associated installation products, one or more manufacturer selections, and one or more construction metrics specification comprising at least one of: an estimate of quantity and a comparative pricing by one or more vendors, of one or more construction products and one or more associated installation products per unit of construction metric specification, a cost saving per unit of construction metric specification, a comparison of various installation techniques that are closely related by category, specification and manufacturer, and a catalog of comparative pricing of the selected construction products and selected associated installation products. The comparative pricing includes, but is not limited to, comparative percentage costs, comparative cost savings, comparative earnings based on estimates for installers, and comparative pricing from a plurality of vendors or manufacturers. The catalog of comparative pricing includes one or more of a) a total cost of the selected construction products and selected associated installation products, b) comparative cost estimates for the each of the selected construction products and selected associated installation products, c) earnings/savings for an installer based on the selection of the products, and the like.

The system 112 receives a selection from the user 104 in the personalized set of selection options. The user 104 may specify a selection by selecting a checkbox displayed on the GUI. The system 112 generates and displays a multi-dimensional virtual representation of one or more construction units with the selected personalized set of selection options including a first set of one or more construction products and a first set of one or more associated installation products, with a corresponding material specification for each of the first set of one or more construction products and the first set of one or more associated installation products. The multi-dimensional virtual representation provides a customizable virtual representation to the user for enabling the user to make a purchase decision. The user is allowed to make selection and purchase of the one or more construction products and one or more associated installation products via the GUI. The multi-dimensional virtual representation provides a movable, multi-dimensional computer graphics model that is a detailed virtual replica of each of the selected construction products and associated installation techniques. The system 112 allows the user 104 to utilize one or more computer input controls to rotate and translate the multi-dimensional virtual representation so as to view it from various angles and positions.

Figure 2:
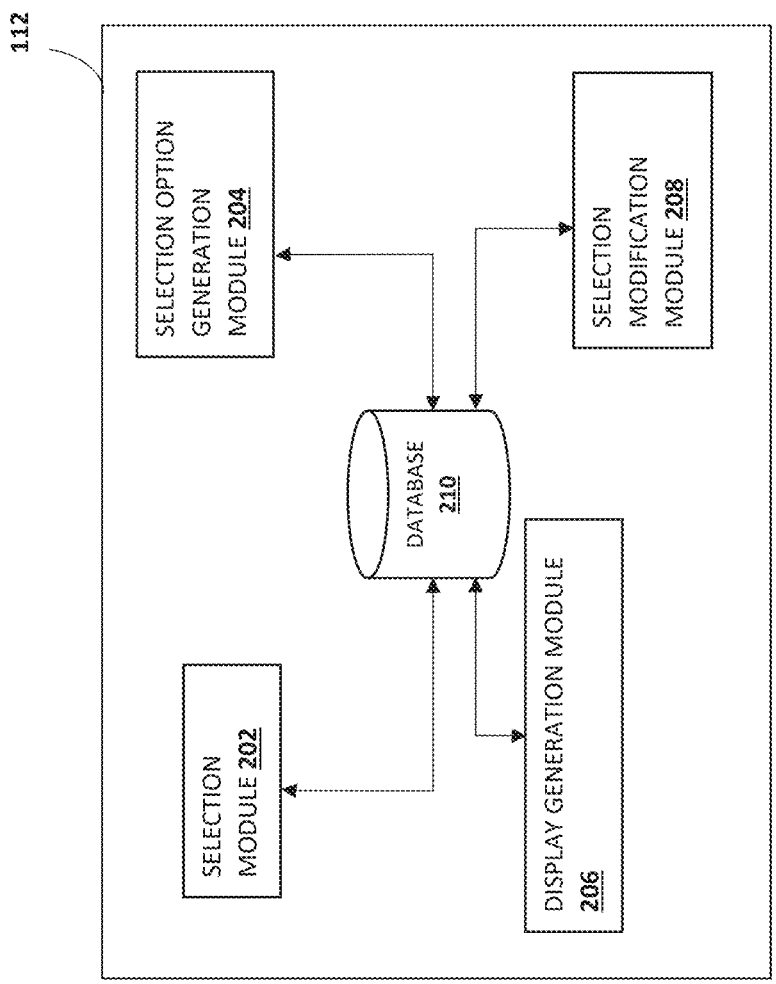
FIG. 2 illustrates an exploded view of the system of the present technology, in accordance with an embodiment.

FIG. 2 illustrates an exploded view of the system 112 of the present technology, in accordance with an embodiment. The system 112 includes a selection module 202, a selection option generation module 204, a display generation module 206, a selection modification module 208, each executable by the processor 110, and a database 210. In an embodiment, the database 210 includes a list of construction products, and associated installation products, corresponding material specification for each of the construction products and associated installation products, such as an initial price, a unit price for each of construction products, and associated installation, a plurality of product assemblies with each product assembly corresponding to one of the plurality of customization options, pricing data (such as manufacturer cost, labor cost, overhead, adjustment factors, suggested retail price or mark-up factor) and the like.

In an embodiment, the selection module 202 is configured to receive a selection of at least one of: a) the one or more construction products, and b) the one or more associated installation products, c) one or more construction metrics specification, and/or d) one or more manufacturer selections from a user via the GUI of the computing device that displays a plurality of options for selection of one or more construction products and one or more associated installation products. The one or more associated installation products correspond to products that enable installation of the one or more construction products on construction units. In an embodiment, the plurality of options for selection of one or more construction products and one or more associated installation products comprises at least one of: selection based on a manufacturer of a construction material, selection based on a manufacturer specification/s, selection based on an industry standard, selection based on a construction material weight, selection based on a construction material yield, selection based on color of the construction material, and selection based on price of the construction material.

The selection option generation module 204 generates and displays a personalized set of selection options for the user based on at least one of: a) the selection received from the user 104 in a current interaction, b) a history of selections by the user in one or more previous interactions, and c) a user preference data. The personalized set of selection options comprises one or more of: an estimate of quantity and a comparative pricing by one or more vendors, of one or more construction products and one or more associated installation products per unit of construction metric specification, and a cost saving per unit of construction metric specification, a track of at least one of: savings, earnings, growth, potential, performance of the user, materials, installation techniques, construction product specification, for each individual selection option from among the one or more construction products and the one or more associated installation products, and a track of materials, installation techniques, product specifications, and the like chosen by user 104. In several embodiments, the personalized set of selection options also includes a catalog of comparative pricing of the selected construction products and selected associated installation products. The catalog of comparative pricing includes at least one of: a) a total cost of the selected construction products and selected associated installation products, b) comparative cost estimates for the each of the selected construction products and selected associated installation products, and c) comparative savings estimates for the each of the selected one or more construction products and the selected one or more associated installation products.

For example, if the user 104 has selected ceramic tile for flooring, and cement backer-board as an installation product for the flooring in several previous interactions with the system 112, the system generates and displays the personalized set of selection options including the various types of ceramic tile flooring options from various vendors, along with cement backer-board based installation product options to the user 104 during a current interaction session with the system 112.

The selection option generation module 204 is further configured to analyse at least one of: a) the selection received from the user in a current interaction, b) a history of selections by the user in one or more previous interactions, and c) a user preference data, using artificial intelligence for generating the personalized set of selection options for the user. In an embodiment, the user preference data is gathered from one or more third party sources (such as social networking platforms, or online activity history details, and the like) using artificial intelligence. For instance, if the user 104 typically selects shades of grey in most purchases done online for various products, the system 112 gathers and analyses the grey preference information from the user preference data and generates selection options in various shades of grey that are most likely to be selected by the user 104.

In an embodiment, the selection option generation module 204 uses one or more of an artificial neural network, a multi-regression analysis, a DNN (Deep Neural Network)), a DBN polygon model, a DBN polygon model, a regression model, a convolutional Neural Network (CNN), a Recurrent Neural Network (RNN), a Restricted Boltzmann Machine Specification (RBM), and the like for analysis. The selection option generation module 204 is also configured to dynamically retrieve pricing details associated with the generated personalized set of selection options for the user 104 from the product database 114 via the server 106. The selection option generation module 204 is further configured to display the generated personalized set of selection options along with the dynamically retrieved pricing detail to the user 104 via the GUI. The selection option generation module 204 is further configured to display a track of at least one of: savings, earnings, growth, potential, performance of the user, materials, installation techniques, construction product specification, for each individual selection option from among the one or more construction products and the one or more associated installation products.

The display generation module 206 receives a selection from the user in the personalized set of selection options and dynamically generates and displays a first multi-dimensional virtual representation of one or more construction units with the selected personalized set of selection options including a first set of one or more construction products and a first set of one or more associated installation products, with a corresponding material specification for each of the first set of one or more construction products and the first set of one or more associated installation products. The first multi-dimensional virtual representation provides a customizable virtual representation to the user for enabling the user to make a purchase decision. As used herein the term "customized virtual representation" refers to a virtual visualization of a perspective view of one or more construction products and one or more associated installation products, personalized based on the needs and interests of the user.

For generating the multi-dimensional virtual representation, the display generation module 206 generates a multi-dimensional perspective view of the first set of one or more construction products and the first set of one or more associated installation products from the personalized set of selection options selected by the user, along with the corresponding material specification for each of the first set of one or more construction products and the first set of one or more associated installation products. The multi-dimensional perspective view includes a perspective view of the first set of one or more construction products overlayed on a perspective view of the first set of one or more associated installation products, also depicted therein. The display generation module 206 converts the multi-dimensional perspective views into the multi-dimensional virtual representation.

In an embodiment, the user 104 is allowed to modify the selection of the one or more construction products and the one or more associated installation products, in the personalized set of selection options. The display generation module 206, modifies and displays a second multi-dimensional virtual representation upon receiving a modification to the selection of the one or more construction products and the one or more associated installation products, from the user 104 via the GUI. In an embodiment, the user 104 is allowed to modify the selection of at least one of: a) the one or more construction products, and b) the one or more associated installation products, c) one or more construction metrics specification, and d) one or more manufacturer selections. In an embodiment, the modification includes changes to at least one of: contents, materials, specifications, quantities, pricing, savings, and any other specifications displayed along with the representation of the one or more construction products and the one or more associated installation products. In another embodiment, the second multi-dimensional virtual representation includes a second set of one or more construction products and a second set of one or more associated installation products, with a corresponding material specification for each of the second set of one or more construction products and the second set of one or more associated installation products, based on the modification to the personalized set of selection options by the user 104. For example, if the user 104 adjusts a total area from an initial 100 square feet to 200 square feet, then the multi-dimensional virtual representation is also modified with the changes to cost estimates of the construction products and the associated installation products, and other parameters that would change due to the change in the total area and the modified version of the multi-dimensional virtual representation is displayed to the user 104.

The display generation module 206 provides one or more filters for filtering the selected one or more construction products and the selected one or more associated installation products and receives selection of one or more filters by the user via the GUI. Examples of the filter, includes but is not limited to, standards of the products, quality of the products, manufacturer of the products, brands of the products, brand color, and the like. The display generation module 206 generates the second multi-dimensional virtual representation with the second set of one or more construction products and the second set of one or more associated installation products, based on the one or more filters selected by the user. In an embodiment, the second multi-dimensional virtual representation includes one or more recommendations with highlights for best and financially beneficial options for the user that enables the user to make the right choice while saving cost.

The selection modification module 208 allows the user to modify the selection of at least one of: a) the one or more construction products, and b) the one or more associated installation products, c) one or more construction metrics specification, d) one or more manufacturer selections, and e) one or more vendor selections. In an embodiment, the modifications are predetermined/pre-set or selected by the user to personalize the modification for the construction unit while interacting with the GUI. The selection modification module 208 also modifies the multi-dimensional virtual representation in real-time and displays a modified multi-dimensional virtual representation with changes in at least one of: a) the one or more construction products, and b) the one or more associated installation products, c) one or more construction metrics specification, and d) one or more manufacturer selections, based on the modification of the personalized set of selection options by the user 104. The modification to the multi-dimensional virtual representation includes changes to at least one of contents, materials, specifications, quantities, pricing, savings, and any other specifications displayed along with the representation of the one or more construction products and the one or more associated installation products, based on the modification to the personalized set of selection options by the user. Examples, of the modifications include, but is not limited to a square feet (total area) modification, price modification, cost saving modification, and the like.

In an embodiment, the selection modification module 208, dynamically modifies the multi-dimensional virtual representation and displays the modified multi-dimensional virtual representation, based on the modification of the personalized set of selection options received from third party sources. In several embodiments, the modified multi-dimensional virtual representation comprises one or more recommendations with highlights for best and financially beneficial options for the user that enables the user to make the right choice while saving cost. In an embodiment, the user is allowed to save one or more favorite selection options. In an embodiment, the user is allowed to mark the one or more favorite selection options using a marking tab, such as star on the GUI.

FIGS. 3A-3E illustrates a series of screenshots depicting exemplary aspects of the system 112, in accordance with various exemplary scenarios.

Figure 3A:
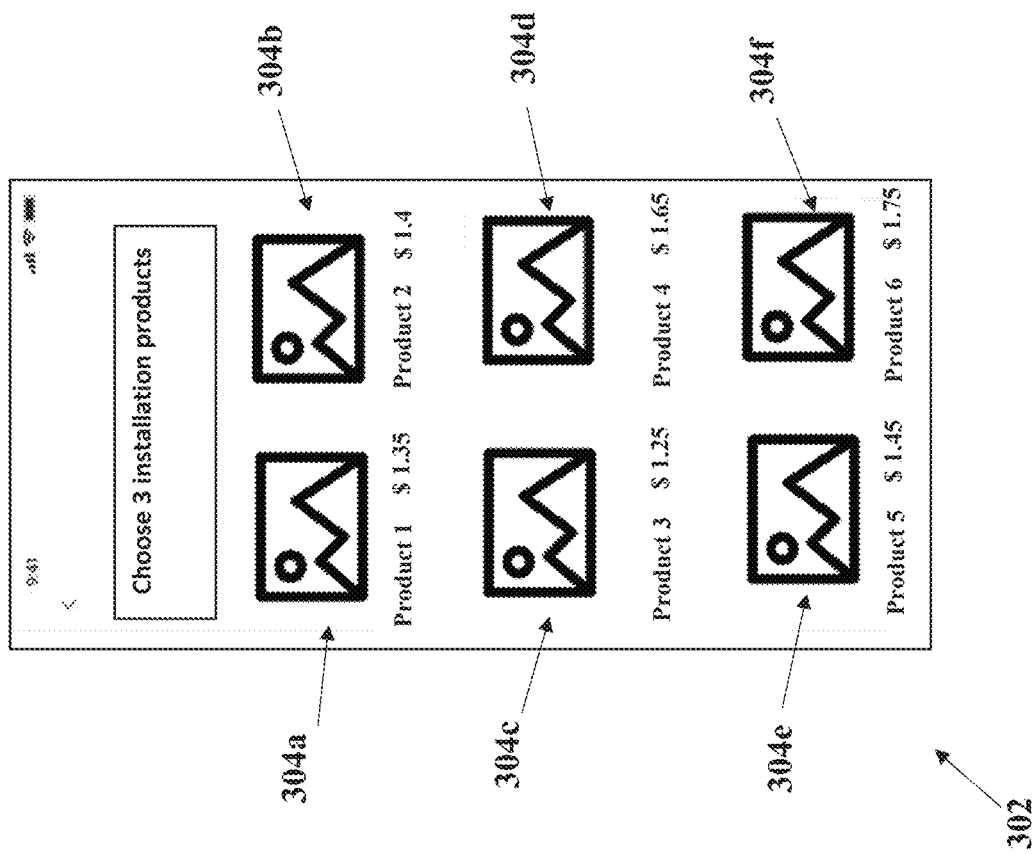
FIG. 3A depicts a user interface view/screen shot of a graphical user interface (GUI) on the computing device upon a user logging into the system of the present technology, in accordance with an exemplary scenario.

More particularly, FIG. 3A depicts a user interface view/screen shot of the GUI on the computing device 102 upon the user 104 logging into the system 112 of the present technology, in accordance with an exemplary scenario. In an exemplary scenario, upon the user 104 logging into the system 112, the user interface view 302 of FIG. 3A is displayed to the user. The user interface view 302 includes multiple installation product selection options 304*a-f* (such as product 1 to product 6 (304*a-f*)) that the user 104 can choose from. The user 104 is also allowed to add the manufacturers of choice or suppliers of choice.

Figure 3B:
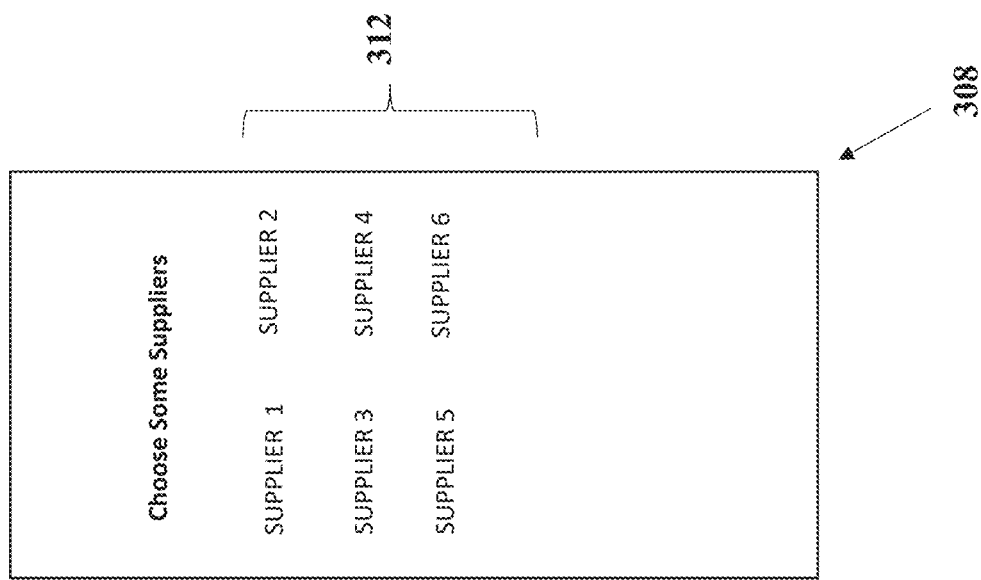
FIG. 3B exemplarily illustrates selection of manufacturers and suppliers by the user, in accordance with an exemplary scenario.

Upon choosing the manufacturers, the system 112 generates and displays a personalized set of selection options for the user 104 based on their selection and the user 104 is shown a user interface view 308 of FIG. 3B. The system 112 provides a list of suppliers 312 that the user 104 can choose from.

In an exemplary scenario, when the user 104 selects from a personalized list of construction products by choosing filters 316 filter 1, filter 2, and filter 3 ((such as for example, Floors-wood, Floors-Concrete, Floors Uncoupling, Floors-BackerBoards, and the like) and associated installation products (such as for example, Thin sets, Baker boards, Uncoupling membranes, Foam, and the like)), the system 112 generates a multi-dimensional (3D) virtual representation 314 as depicted FIG. 3C that provides a customizable virtual representation of the construction products (such as "Ceramic Tile" for flooring) and associated installation products (such as "Cement backer board" or "Fiber cement backer board", "Dry-Set Mortar", "Optional membrane", and the like) to the user 104. The customized virtual representation provided through the multi-dimensional virtual representation 314, enables the user 104 to make a purchase decision. The user 104 is further allowed to modify selection of the associated installation products and other options such as "Manufacturer", "Product" and other "Installation Filters" such as filter 1, filter 2, and filter 3 318 as shown in the user interface view 320 of FIG. 3D and choose from a dropdown list of installation filters such as installation filter 3 to installation filter 6 321.

Figure 3E:
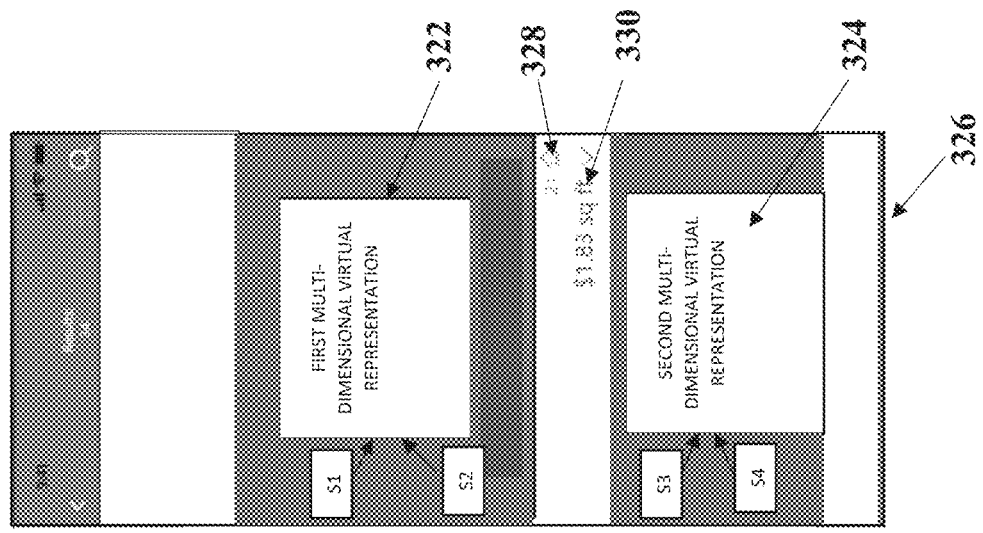

FIG. 3E depicts two three-dimensional (3D) virtual representations 322 and 324 generated by the system 112 and displayed to the user 104 via the user interface view 326, in accordance with an exemplary scenario. A first 3D virtual representation 322 can include for example, an interior application of "wonder board lite" over a single later of exterior grade plywood or oriented strand board (OSB) subfloor. The user interface view 326 also depicts installation products specifications S1 and S2 that can include, for example mesh tape, board spacing, exterior grade plywood, board breaking tape, thin set mortars, and the like. Similarly, a second 3D virtual representation 324 depicts can include for example, interior floor over word substrate with joint with plywood substrate and reinforced unbounded mortar bed. The installation product specifications S3, S4, associated with the second 3D virtual representation 324 can include for example, bond coat, membrane, mortar bed, metal lath, and the like. The user 104 can mark the preference as favorite by clicking on the star button 324. The user interface view 326 shows a comparative view of the two 3D virtual representations 322 and 324 so as to enable the user 104 to make selection and purchase decision conveniently by comparing the two. The user 104 can click on the "star" button 328 to personalize. The average cost per square foot $1.83 330 is also depicted to the user 104.

FIG. 4A depicts a user interface view 402 depicting the selection of installation products based on the one or more filters selected by the user 104, in accordance with an exemplary scenario. For a default total area of 100 square foot 404, the average cost estimated by the system 112 is $183 406. If the user 104 selects "Thin set (for backer board)" 408, the system 112 generates an estimated quantity required as 50 pounds bags (2) 410, for the installation product selected by the user 104. The system 112 also determines and displays the cost per square foot as $1.83 and $0 savings 412.

FIG. 4B depicts a user interface view 414 illustrating selection of default options for various manufacturer specifications, in accordance with an exemplary scenario. The various manufacturer specification includes construction products, defaults by specification code standard, specification quality, manufacturer, brand, brand color, materials listed by image, name, price, average cost (such as $183), loss to $0 savings, changes per user selections and user 104 can make the selections and click on the "Apply filter" button 416 or tab to apply the filters.

In several embodiments, the user 104 is displayed product highlights indicative of negative or positive influence of the selection of the user. Upon the user 104 making a selection of a product with highlight showing positive influence, the average cost decreases while increasing the saving. In several embodiments, the system 112 also generates new cost attributes that includes a change in average cost and per square foot cost.

In several embodiments, the user 104 is allowed to change the total square foot using the GUI by, for example, scrolling on the GUI using for example, a scroller. The system 112 allows the user 104 to save the selection. Upon change in the square feet by the user 104, the system 112 dynamically generates a three-dimensional (3D) representation for providing a virtual visualization of the products selected by the user 104 along with the updated material specifications.

In several embodiment, the system 112 also allows the user 104 to view total cost savings and savings per square foot separately on the user interface view. Also, the system 112 depicts a "career savings" which is the net savings for all jobs selected by the user 104.

In several embodiments, the system 112 also allows the user 104 to select available tools, by for example, tool types and tool sizes. The tool selections by the user 104 are reflected along with the 3D representation generated by the system 112. The tool selection does not affect quantities, pricing and savings until the material is selected by the user 104.

In several embodiments, upon user 104 selecting a manufacturer, the construction product corresponding to the manufacturer are displayed to the user via the GUI. In several embodiments, the construction products are marked as either with a positive influence or negative influence on savings for the user 104, based on user inputs and data. If the user selects a construction product with a negative influence, the selection negatively influences the cost per square foot which increases and also increases average cost. Upon user 104 selecting construction products marked with positive influence, the cost per square foot reduces while increasing savings. The selection of construction products affects the quantities, weights, pricing and savings of the construction products for the user 104.

In several embodiments, the system 112 allows the user 104 to set earning goal and the installation price per square feet gets adjusted accordingly. The earning goal selected by the user 104 is also displayed along with the multi-dimensional representation generated by the system 112. In several embodiments, the user 104 is allowed to choose a local retailer, by for example, a zip code specified by the user 104, and the construction products sold by the local retailer as shown to the user 104 based on user location/zip code.

The system 112 allows the user 104 to add finalized products to a shopping cart for purchase, in accordance with exemplary scenario. In several embodiments, the user 104 is allowed to track his own growth, potential and performance.

Figure 4D:
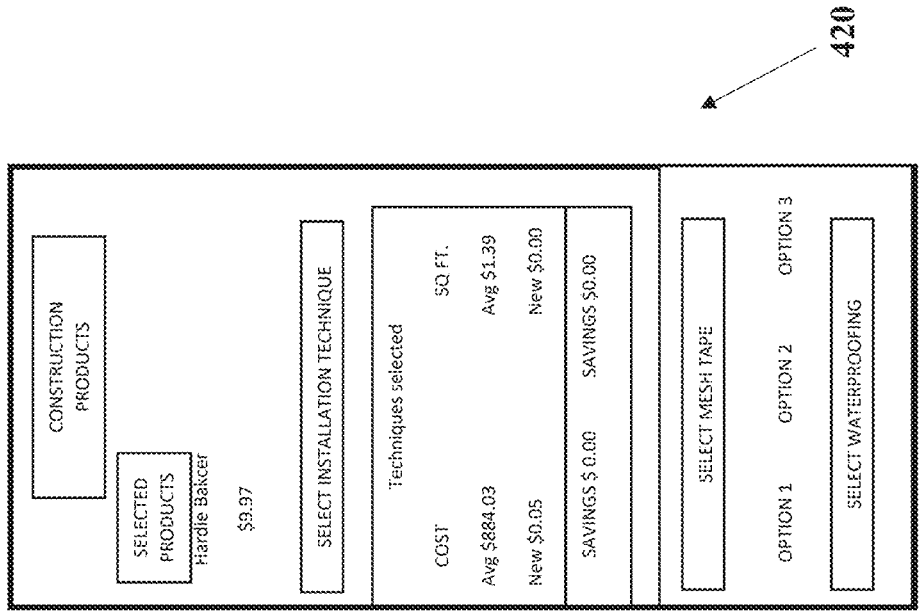
FIG. 4C-4D illustrates selection of "MyWay" button by the user in the system of the present technology, in accordance with an exemplary scenario.
Figure 4C:
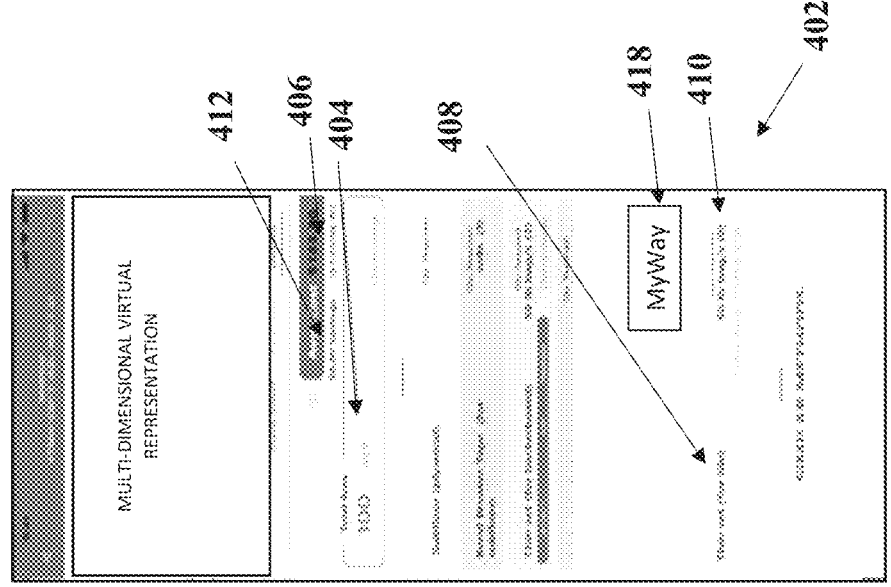

In several embodiments, the user interface view includes a "MyWay" button 418 as depicted in FIG. 4C. Upon selection of the "MyWay" button 418 user 104 is displayed a user interface view 420 as depicted in FIG. 4D. The user is displayed current and previous selections done by the user and a comparative list of all current available and comparable selections via the user interface. The "MyWay" button enables the user to select pricing methods, displays price per square foot, saving on method costs, comparing products and finding specified products. In several embodiments, the system 112 displays an approximate percentage increase or decrease in cost estimates of the user selections based on fluctuation of market costs for various construction products and/or installation products upon the user selecting the "MyWay" button. The user data generated by clicking the "MyWay" button is then saved and used in future for providing customized options and selections for the user based on previous selections or activity of the user, for example, by using artificial intelligence based techniques. It should be understood, that the "MyWay" terminology may vary without departing from the spirit and scope of the invention. For instance, in some embodiments, the button 418 may be referred as the customize button or similar terminology. Likewise, other analogous terms, phrases, or propriety expressions may be used.

Figure 5A:
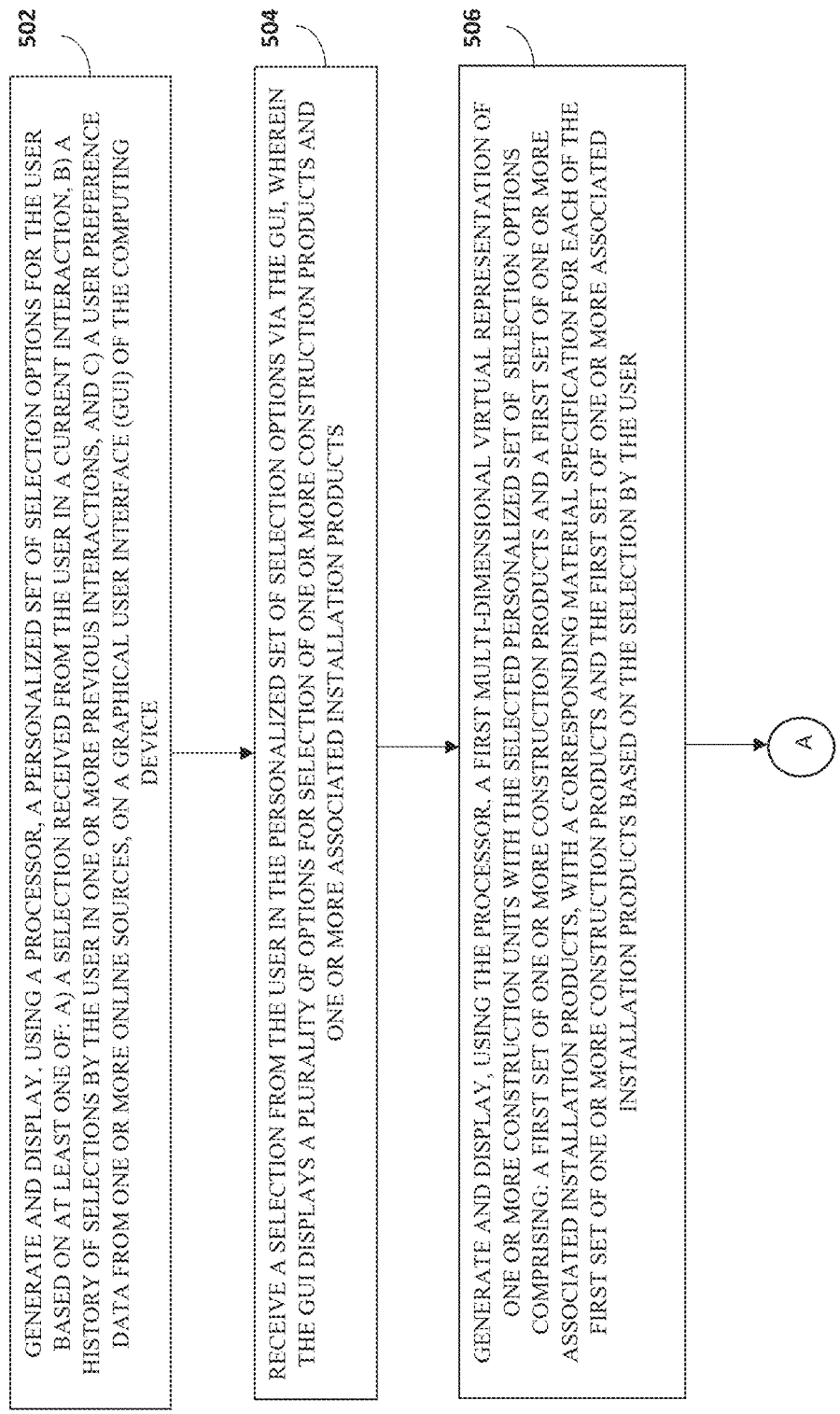
FIGS. 5A-5B depicts a flow diagram that illustrates a processor-implemented method of providing a customizable virtual representation for selection and purchase of one or more construction products and one or more associated installation products, using a computing device, in accordance with an embodiment.
Figure 5B:
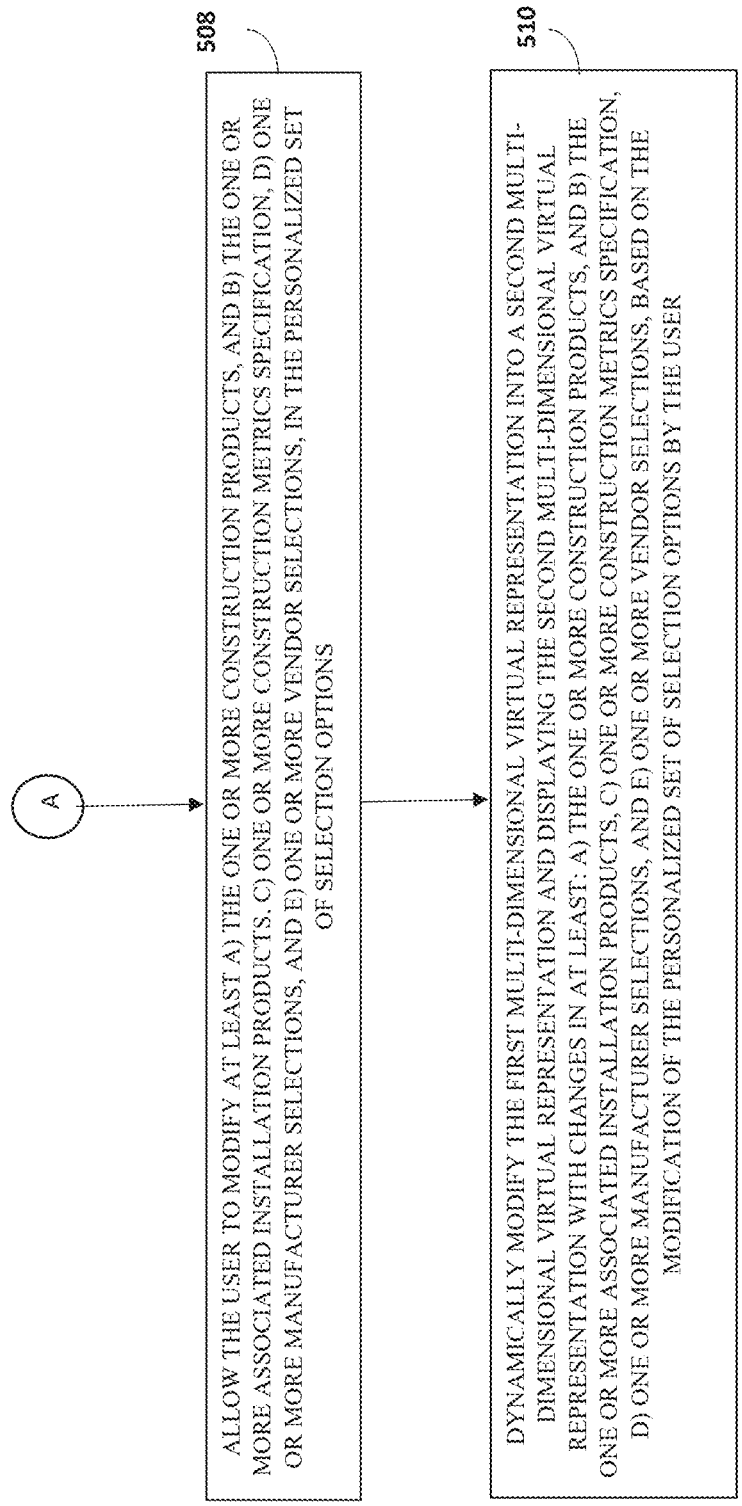

FIGS. 5A-5B depicts a flow diagram that illustrates a processor-implemented method of providing a customizable virtual representation for selection and purchase of one or more construction products and one or more associated installation products, using a computing device. In an embodiment, at step 502, a personalized set of selection options for the user based on a) a selection received from the user in a current interaction, b) a history of selections by the user in one or more previous interactions, and c) a user preference data from one or more online sources, on a graphical user interface (GUI) of the computing device, is generated and displayed. At step 504, a selection in the personalized set of selection options is received from the user via the GUI, where the GUI displays a plurality of options for selection of one or more construction products and one or more associated installation products. At step 506, a first multi-dimensional virtual representation of one or more construction units with the selected personalized set of selection options comprising: a first set of one or more construction products and a first set of one or more associated installation products, with a corresponding material specification for each of the first set of one or more construction products and the first set of one or more associated installation products is generated and displayed based on the selection by the user. At step 508, the user is allowed to modify at least one of: a) the one or more construction products, and b) the one or more associated installation products, c) one or more construction metrics specification, d) one or more manufacturer selections, and e) one or more vendor selections, in the personalized set of selection options. At step 510, the first multi-dimensional virtual representation is dynamically modified and a second multi-dimensional virtual representation is displayed with changes in at least one of: a) the one or more construction products, and b) the one or more associated installation products, c)

one or more construction metrics specification, d) one or more manufacturer selections, and e) one or more vendor selections, based on the modification of the personalized set of selection options by the user.

Figure 6:
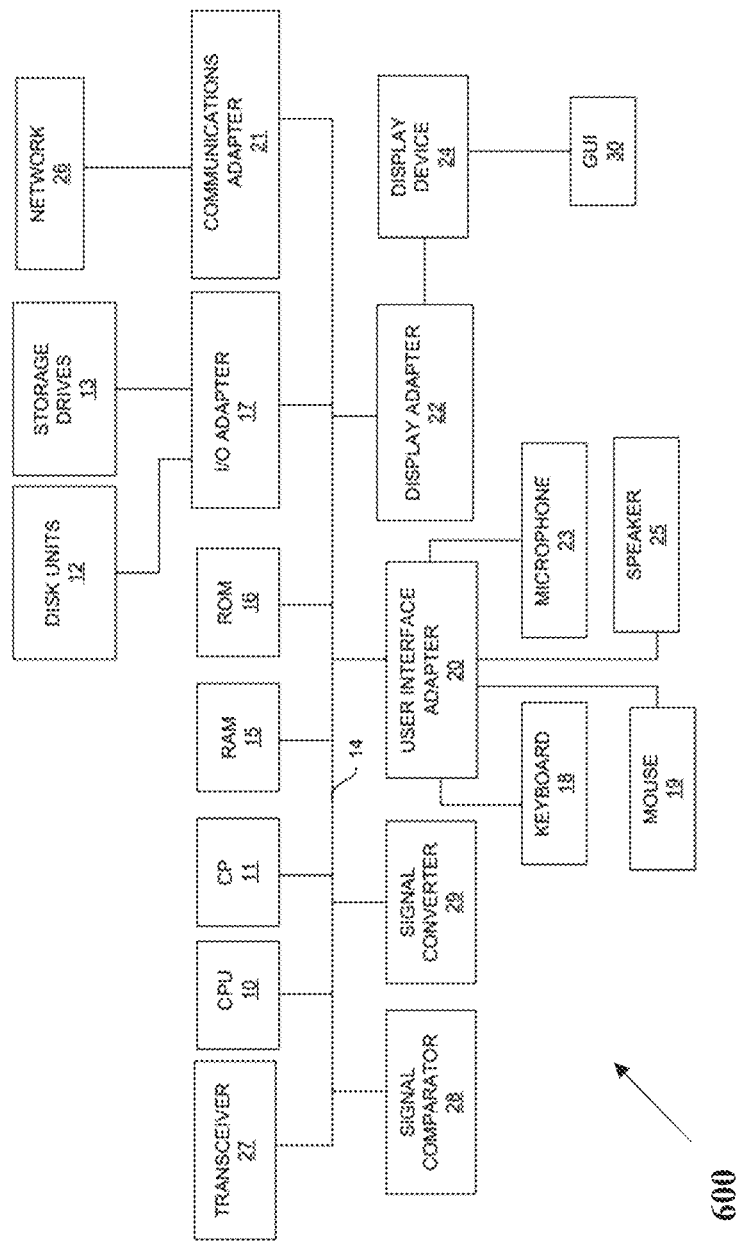
FIG. 6 depicts a representative hardware environment for practicing the embodiments herein.

A representative hardware environment for practicing the embodiments herein is depicted in FIG. 6 with reference to FIGS. 1 through 5. The schematic drawing 600 of FIG. 6 illustrates a hardware configuration of computing device 102 of FIG. 1, in accordance with the embodiments herein. The hardware configuration includes at least one processing device 10 and a cryptographic processor 11. The computing device 102 may include one or more of a personal computer, a laptop, a tablet device, a smartphone, a mobile communication device, a personal digital assistant, or any other such computing device, in one example embodiment. The computing device 102 includes one or more processor (e.g., the processor 108) or central processing unit (CPU) 10. The CPUs 10 are interconnected via system bus 12 to various devices such as a memory 14, read-only memory (ROM) 16, and an input/output (I/O) adapter 18. Although, CPUs 10 are depicted, it is to be understood that the computing device 102 may be implemented with only one CPU.

The I/O adapter 18 can connect to peripheral devices, such as disk units 11 and tape drives 13, or other program storage devices that are readable by the system. The computing device 102 can read the inventive instructions on the program storage devices and follow these instructions to execute the methodology of the embodiments herein. The computing device 102 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Various embodiments of the present technology enable integration of construction material data (manufacturer specifications and retailer pricing) into a database. Additionally, the present technology provides a customizable virtual representation to the user to enable selection and purchase of construction products and associated installation products. The present technology also provides a unique virtual multi-dimensional representation of the selected construction products overlayed with the associated installation products, that provides a virtual visualization of the user selections, personalized based on the user preference data. The present technology also enables the user to obtain a comparative pricing for various selections and also cost savings and enables the user to make better decision regarding selection and purchase of the construction products and associated installation products. Moreover, the present technology provides a personalized experience to the user by determining selection options for the user based on user preference data, and current or history of selections by the user and also allows the user to filter/modify selections. The present technology not only enables the user to visualize the construction products virtual multi-dimensional representation, but also lets the user choose and modify the installation products that can be used for installing the selected construction products, thereby providing realistic and more accurate cost estimates and cost saving estimates to the user.

The embodiments of the system of the present technology herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

A portion of the disclosure of this patent document contains material which is subject to copyright protection. The copyright owner has no objection to the reproduction by anyone of the patent document or the patent disclosure, as it appears in the Patent and Trademark Office patent file or records, but otherwise reserves all copyright rights whatsoever.

The invention claimed is:

1. A processor-implemented method of providing a customizable virtual representation for selection and purchase of one or more construction products and one or more associated installation products, using a computing device, the method comprising the steps of:

generating and displaying, using a display generation module, a personalized set of selection options for the user based on at least one of: a) a selection received from the user in a current interaction, b) a history of selections by the user in one or more previous interactions, and c) a user preference data from one or more online sources, on a graphical user interface (GUI) of the computing device, wherein the personalized set of selection options are generated in real-time using artificial intelligence;

receiving a selection from the user in the personalized set of selection options via the GUI, using a selection module, wherein the GUI displays a plurality of options for selection of one or more construction products and one or more associated installation products, wherein the one or more associated installation products correspond to products that enable installation of the one or more construction products on construction units; and generating and displaying, using a selection option generation module, a first multi-dimensional virtual representation of one or more construction units with the selected personalized set of selection options comprising: a first set of one or more construction products and a first set of one or more associated installation products, with a corresponding material specification for each of the first set of one or more construction products and the first set of one or more associated installation products based on the selection by the user;

allowing the user to modify, using a selection modification module, at least one of: a) the one or more construction products, and b) the one or more associated installation products, c) one or more construction metrics specification, d) one or more manufacturer selections, and e) one or more vendor selections, in the personalized set of selection options; and dynamically modifying, using the selection modification module, the first multi-dimensional virtual representation into a second multi-dimensional virtual representation with changes in at least one of: a) the one or more construction products, and b) the one or more associated installation products, c) one or more construction metrics specification, d) one or more manufacturer selections, and e) one or more vendor selections, based on the modification of the personalized set of selection options by the user and displaying the second multi-dimensional virtual representation to the user via the GUI, wherein the first multi-dimensional virtual representation and the second multi-dimensional virtual representation includes a perspective view of a set of one or more construction products overlayed on a perspective view of a set of one or more associated installation products;

whereby the user is allowed to make selection and purchase of the one or more construction products and one or more associated installation products via the GUI; and wherein the first and the second multi-dimensional virtual representations provides a customizable virtual representation to the user for enabling the user to make a purchase decision; and wherein the first and the second multi-dimensional virtual representations enable the user to obtain a comparative pricing for various selections and also cost savings and enables the user to make better decision regarding selection and purchase of the construction products and associated installation products.

2. The processor-implemented method of claim 1, wherein the personalized set of selection options comprises at least: the one or more construction products, the one or more associated installation products, one or more manufacturer selections, one or more vendor selections, and one or more construction metrics specification comprising at least: an estimate of quantity and a comparative pricing by one or more vendors, of one or more construction products and one or more associated installation products per unit of construction metric specification, and a cost saving per unit of construction metric specification.

3. The processor-implemented method of claim 2, wherein allowing the user to modify the selection comprises:
    providing one or more filters for filtering the selected one or more construction products and the selected one or more associated installation products;
    receiving selection of one or more filters by the user via the GUI; and
    generating the modified multi-dimensional virtual representation with modification to at least: a) the one or more construction products, and b) the one or more associated installation products, c) one or more construction metrics specification, d) one or more manufacturer selections, and e) one or more vendor selections, based on the one or more
    filters selected by the user, wherein the modified the modified multi-dimensional virtual representation comprises one or more recommendations with highlights for beneficial options for the user that enables the user to make the right choice.

4. The processor-implemented method of claim 1, further comprising performing prior to generating and displaying a personalized set of selection options for the user:
    receiving a selection of at least one of: a) the one or more construction products,
    and b) the one or more associated installation products, c) one or more construction metrics specification, d) one or more manufacturer selections, and e) one or more vendor selections, from the user via the GUI.

5. The processor-implemented method of claim 1, wherein generating and displaying the personalized set of selection options for the user comprises:
    analysing at least one of: a) the selection received from the user in a current interaction,
    b) a history of selections by the user in one or more previous interactions, and c) a user preference data, generating the personalized set of selection options for the user,
    wherein the user preference data is gathered from one or more third party sources;
    dynamically retrieving pricing details associated with the generated personalized set of selection options for the user from a database; and
    displaying the generated personalized set of selection options along with the dynamically retrieved pricing details to the user via the GUI.

6. The processor-implemented method of claim 1, wherein comparative pricing comprises at least one of: comparative percentage costs, comparative cost savings, comparative earnings based on estimates for installers, and comparative pricing from a plurality of vendors or manufacturers.

7. The processor-implemented method of claim 1, wherein the modifications are predetermined/pre-set by the manufacturers and selected by the user to personalize the modifications while interacting with the GUI.

8. The processor-implemented method of claim 1, wherein the personalized set of selection options further comprises a catalogue of comparative pricing of the selected construction products and selected associated installation products.

9. The processor-implemented method of claim 8, wherein the catalogue of comparative pricing comprises at least one of: a) a total cost of the selected construction products and selected associated installation products, b) comparative cost estimates for the each of the selected construction products and selected associated installation products, and c) comparative savings estimates for the each of the selected one or more construction products and the selected one or more associated installation products.

10. The processor-implemented method of claim 1, wherein the first multi-dimensional virtual representation and the second multi-dimensional virtual representation comprises a multi-dimensional perspective view of the selection received from the user from the personalized set of selection options.

11. The processor-implemented method of claim 1, wherein the first multi-dimensional virtual representation and the second multi-dimensional virtual representation comprises:
   a multi-dimensional perspective view of the first set of one or more construction products and the first set of one or more associated installation products from the personalized set of selection options selected by the user, along with the corresponding material specification for each of the first set of one or more construction products and the first set of one or more associated installation products, wherein multi-dimensional perspective view comprises a perspective view of the first set of one or more construction products overlayed on a perspective view of the first set of one or more associated installation products.

12. The processor-implemented method of claim 1, wherein displaying the personalized set of options comprises:
   displaying a track of at least one of: savings, earnings, growth, potential, performance of the user, materials, installation techniques, construction product specification, for each individual selection option from among the one or more construction products and the one or more associated installation products.

13. The processor-implemented method of claim 1, wherein the user is allowed to save one or more favourite selection options.

14. The processor-implemented method of claim 1, wherein the plurality of options for selection of one or more construction products and one or more associated installation products comprises at least one of: selection based on a manufacturer of a construction material, selection based on a manufacturer specification/s, selection based on an industry standard, selection based on a construction material weight, selection based on a construction material yield, selection based on color of the construction material, and selection based on price of the construction material.

15. A system for providing a personalized a customizable virtual representation for selection and purchase of one or more construction products and one or more associated installation products, the said system comprising:
   a memory that stores non-transitory executable instructions and a relational database comprising data associated with a plurality of construction products, a plurality of associated installation products, and one or more construction metrics specifications and one or more executable modules;
   a processor that executes the one or more executable modules for enabling selection and purchase of one or more construction products and one or more associated installation products, the one or more executable modules comprising:
   a display generation module configured for generating and displaying a personalized set of selection options for the user based on at least one of: a) a selection received from the user in a current interaction, b) a history of selections by the user in one or more previous interactions, and c) a user preference data from one or more online sources;
   a selection module configured for receiving a selection from the user in the personalized set of selection options via the GUI, wherein the GUI displays a plurality of options for selection of one or more construction products and one or more associated installation products;
   a selection option generation module configured for generating and displaying, a first multi-dimensional representation of one or more construction units with a first set of one or more construction products and a first set of one or more associated installation products, with a corresponding material specification for each of the first set of one or more construction products and the first set of one or more associated installation products, based on the selection by the user;
   a selection modification module for: allowing the user to modify at least a) the one or more construction products, and b) the one or more associated installation products, c) one or more construction metrics specification, d) one or more manufacturer selections, and e) one or more vendor selections, in the personalized set of selection options; and
   dynamically modifying the first multi-dimensional virtual representation and displaying a second multi-dimensional virtual representation with changes in at least: a) the one or more construction products, and b) the one or more associated installation products, c) one or more construction metrics specification, d) one or more manufacturer selections, and e) one or more vendor selections, based on the modification of the personalized set of selection options by the user;
   whereby the user is allowed to make selection and purchase of the one or more construction products and one or more associated installation products via the GUI;
   whereby the first and the second multi-dimensional virtual representations provides a customizable virtual representation to the user for enabling the user to make a purchase decision; and
   whereby the first and the second multi-dimensional virtual representations enable the user to obtain a comparative pricing for various selections and also cost savings and enables the user to make better decision regarding selection and purchase of the construction products and associated installation products.

16. The system of claim 15, wherein the user is allowed to modify at least a) the one or more construction products, and b) the one or more associated installation products, c) one or more construction metrics specification, d) one or more manufacturer selections, and e) one or more vendor selections, in the personalized set of selection options and the multidimensional virtual representation is dynamically modified, based on the modification by the user and a modified multi-dimensional virtual representation with changes in at least:

a) the one or more construction products, and b) the one or more associated installation products, c) one or more construction metrics specification, d) one or more manufacturer selections, and e) one or more vendor selections, based on the modification, is displayed to the user.

17. The system of claim 15, wherein pricing details associated with the selected one or more construction products and the one or more associated installation products are dynamically retrieved from the relational database, based on the selection received from the user and the personalized set of selection options is generated based on the dynamically retrieved pricing details.

18. The system of claim 15, wherein allowing the user to modify the selection comprises:

providing one or more filters for filtering the selected one or more construction products and the selected one or more associated installation products;

receiving selection of one or more filters by the user via the GUI; and generating the modified multi-dimensional virtual representation with modification to at least: a) the one or more construction products, and b) the one or more associated installation products, c) one or more construction metrics specification, d) one or more manufacturer selections, and e) one or more vendor selections, based on the one or more filters selected by the user, wherein the modified multi-dimensional virtual representation comprises one or more recommendations with highlights for beneficial options for the user that enables the user to make the right choice.

19. One or more non-transitory computer-readable storage mediums storing one or more sequences of instructions, which when executed by one or more processors, causes a method of providing a personalized user experience for selection and purchase of one or more construction products and one or more associated installation products, using a computing device, the method comprising the steps of:

generating and displaying, using a processor, a personalized set of selection options for the user based on a) a selection received from the user in a current interaction, b)

a history of selections by the user in one or more previous interactions, and c) a user preference data from one or more online sources, on a graphical user interface (GUI) of the computing device;

receiving a selection from the user in the personalized set of selection options via the GUI, wherein the GUI displays a plurality of options for selection of one or more construction products and one or more associated installation products; and generating and displaying, using the processor, a first multi-dimensional virtual representation of one or more construction units with the selected personalized set of selection options comprising: a first set of one or more construction products and a first set of one or more associated installation products, with a corresponding material specification for each of the first set of one or more construction products and the first set of one or more associated installation products based on the selection by the user;

allowing the user to modify at least a) the one or more construction products, and b) the one or more associated installation products, c) one or more construction metrics specification, d) one or more manufacturer selections, and e) one or more vendor selections, in the personalized set of selection options; and dynamically modifying the first multi-dimensional virtual representation into a second multi-dimensional virtual representation with changes in at least: a) the one or more construction products, and b) the one or more associated installation products, c) one or more construction metrics specification, d) one or more manufacturer selections, and e) one or more vendor selections, based on the modification of the personalized set of selection options by the user and displaying the second multi-dimensional virtual representation to the user via the GUI;

whereby the user is allowed to make selection and purchase of the one or more construction products and one or more associated installation products via the GUI and wherein the first and the second multi-dimensional virtual representations provides a customizable virtual representation to the user for enabling the user to make a purchase decision.

* * * * *